(12) United States Patent
Pyun et al.

(10) Patent No.: US 7,967,382 B2
(45) Date of Patent: Jun. 28, 2011

(54) SIDE BOLSTER APPARATUS FOR AUTOMOBILE SEAT

(75) Inventors: Jong Kweon Pyun, Suwon-si (KR); Chan Ho Jeong, Seoul (KR); Jung Sang You, Seoul (KR); Ki Jin Kwon, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 103 days.

(21) Appl. No.: 12/358,059

(22) Filed: Jan. 22, 2009

(65) Prior Publication Data

US 2010/0045087 A1    Feb. 25, 2010

(30) Foreign Application Priority Data

Aug. 20, 2008  (KR) .................. 10-2008-0081107

(51) Int. Cl.
*A47C 3/00*  (2006.01)
*B60N 2/02*  (2006.01)
(52) U.S. Cl. ................... 297/284.9; 297/378.1
(58) Field of Classification Search .............. 297/284.9, 297/378.1
See application file for complete search history.

(56) References Cited

U.S. PATENT DOCUMENTS

| 6,805,405 | B2 * | 10/2004 | Koo | 297/284.7 |
|---|---|---|---|---|
| 7,086,700 | B2 * | 8/2006 | Habedank | 297/378.1 |
| 7,108,323 | B2 * | 9/2006 | Welch et al. | 297/284.9 |
| 2004/0140705 | A1 * | 7/2004 | McMillen et al. | 297/378.1 |

FOREIGN PATENT DOCUMENTS

| JP | 2000-52821 A | 2/2000 |
|---|---|---|
| JP | 2005-343445 A | 12/2005 |
| JP | 2007-111121 A | 5/2007 |
| JP | 2007-135778 A | 6/2007 |
| KR | 10-2008-0005440 A | 1/2008 |

* cited by examiner

*Primary Examiner* — Sarah B McPartlin
(74) *Attorney, Agent, or Firm* — Morgan, Lewis & Bockius LLP

(57) ABSTRACT

The side bolster apparatus includes a pressing unit formed on one side of a foldable seat back and rotating around a rotating shaft of the seat back, bolster installed so as to protrude from a rear side of the seat back, and an external force transmitting unit receiving external force from the pressing unit when the seat back is unfolded and transmitting the received external force to the bolster such that the bolsters protrude from the seat back.

10 Claims, 6 Drawing Sheets

SIDE BOLSTER APPARATUS FOR AUTOMOBILE SEAT

CROSS-REFERENCE TO RELATED APPLICATION

The present application claims priority to Korean Patent Application No. 10-2008-0081107 filed Aug. 20, 2008, the entire contents of which application is incorporated herein for all purposes by this reference.

BACKGROUND OF THE INVENTION

1. Field of the Invention

The present invention relates to a side bolster apparatus for an automobile seat and, more particularly, to a side bolster apparatus for an automobile seat, in which, when a folded seat back is unfolded from the seat, side bolster protrude from rear side of the seat back so as to surround the back of a passenger, thereby improving seating comfort.

2. Description of Related Art

In general, an automobile seat is made up of a seat cushion fixed to an automobile body so as to enable a passenger to sit thereon and a seat back rotatably installed on the seat cushion so as to serve as a backrest.

The seat back is equipped with bolster, which slightly protrudes from rear side of the seat back so as to surround the back of a passenger when the passenger takes the seat. In the case of rear seats for a recreational vehicle (RV), the rear seats employ sinking seats held in a floor of the RV, or double folding seats folded twice in order to simultaneously secure a passenger seating space and a cargo loading space in the rear of the RV. These rear seats have flat seat backs without the bolster in order to minimize a thickness when folded.

FIG. 1 illustrates an ordinary sinking seat, and FIG. 2 illustrates a folded double folding seat.

As illustrated in FIG. 1, a predetermined holding space 2 is formed in the floor 1 of an automobile body. A rear seat 10 can be held in the holding space 2 in a folded state.

When the rear seat 10 can be held in the holding space 2, no seat protrudes from the floor 1, so that the floor 1 can be used for a variety of purposes, for instance for loading a large quantity of cargo on the floor.

Further, as illustrated in FIG. 2, since a recent seat 20 has a double foldable structure, a rear cargo loading space 30 is increased when the seat 20 is doubly folded, so that a large quantity of cargo can be loaded in the rear cargo loading space 30.

However, as described above, in order to reduce the volume and thickness when the sinking seat 10 or the double folding seat 20 is folded, the front of the seat back is kept flat. Thus, the thickness of the seat is reduced when the seat is folded. However, while the automobile is cornering, the body of the passenger rolls from side to side in this configuration, so that the seating comfort is reduced.

However, when the bolster is formed on the seat back of the sinking seat or the double folding seat as in the related art, the thickness of the seat is increased when the seat is folded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a side bolster apparatus, in which bolster protrudes from a seat back when the seat back is unfolded but not when the seat back is folded, thereby improving seating comfort of a passenger without damage to a folding function of the seat back.

In an exemplary embodiment of the present invention, the side bolster apparatus for a foldable seat back may include a pressing unit formed on lower portion of the seat back so as to rotate around a rotating shaft of the seat back with rotation of the seat back, a bolster configured to protrude forwards from rear side of the seat back, and/or an external force transmitting unit receiving external force from the pressing unit when the seat back is unfolded and transmitting the received external force to the bolster such that the bolster protrude from the seat back.

The bolster may have a predetermined curvature in a longitudinal direction of the seat back.

The external force transmitting unit may include an elevator raising or lowering the bolster with respect to the seat back, a direction converter slidably coupled to the seat back and moving in substantially perpendicular direction to a movement direction of the elevator, wherein the direction converter has a slope so as to provide the external force to the elevator, and/or a cable, wherein one end thereof is connected to the direction converter and the other end thereof is connected to the pressing unit.

The elevator may include a stationary guide fixed to the seat back such that the direction converter is displaceable thereto, wherein the stationary guide has a slit formed on one lateral side thereof in a direction where the bolster is raised or lowered, and/or a movable guide slidably coupled to the stationary guide, one end of which is connected with the bolster and the other end of which includes a guide knob fitted into the slit of the stationary guide to move therein, the movable guide raised or lowered by the slope of the direction converter.

The direction converter may include a guide pin, one end of which is fixed to the seat back so as to guide motion of the direction converter along a designated path.

The other end of the guide pin may be configured to pass through a portion of the direction converter to guide the motion of the direction converter.

The guide pin may be aligned to be in substantially perpendicular direction to movement direction of the movable guide of the elevator.

The direction converter may include a first elastic member disposed substantially along a movement direction of the direction converter and is restored to an original position thereof by restoring force of the first elastic member when the external force of the pressing unit is removed so that the bolster returns to original position thereof. The elastic member may be a compression spring.

The elevator may include a second elastic member disposed under the movable guide in the stationary guide and couples a lower portion of the movable guide and the seat back so that the movable guide is biased toward the seat back. The elastic member may be an extension spring.

The cable may include a ball hooked on the pressing unit at the other end thereof and the pressing unit includes a ball guide having a guide slot on a rotating path thereof such that the ball moves along the rotating path of the pressing unit, wherein the ball guide is formed at the seat frame. The guide slot may have an arcuate shape corresponding to the rotating path of the pressing unit.

The methods and apparatuses of the present invention have other features and advantages which will be apparent from or are set forth in more detail in the accompanying drawings, which are incorporated herein, and the following Detailed

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
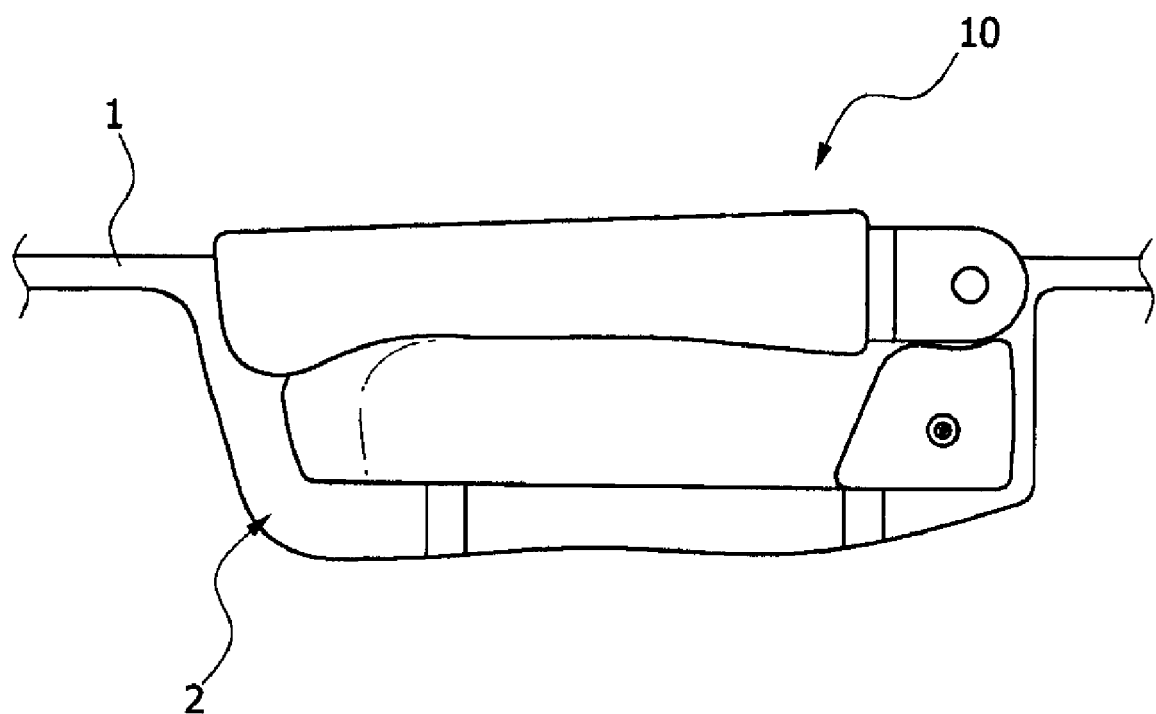
FIG. 1 illustrates a conventional sinking seat.
Figure 2:
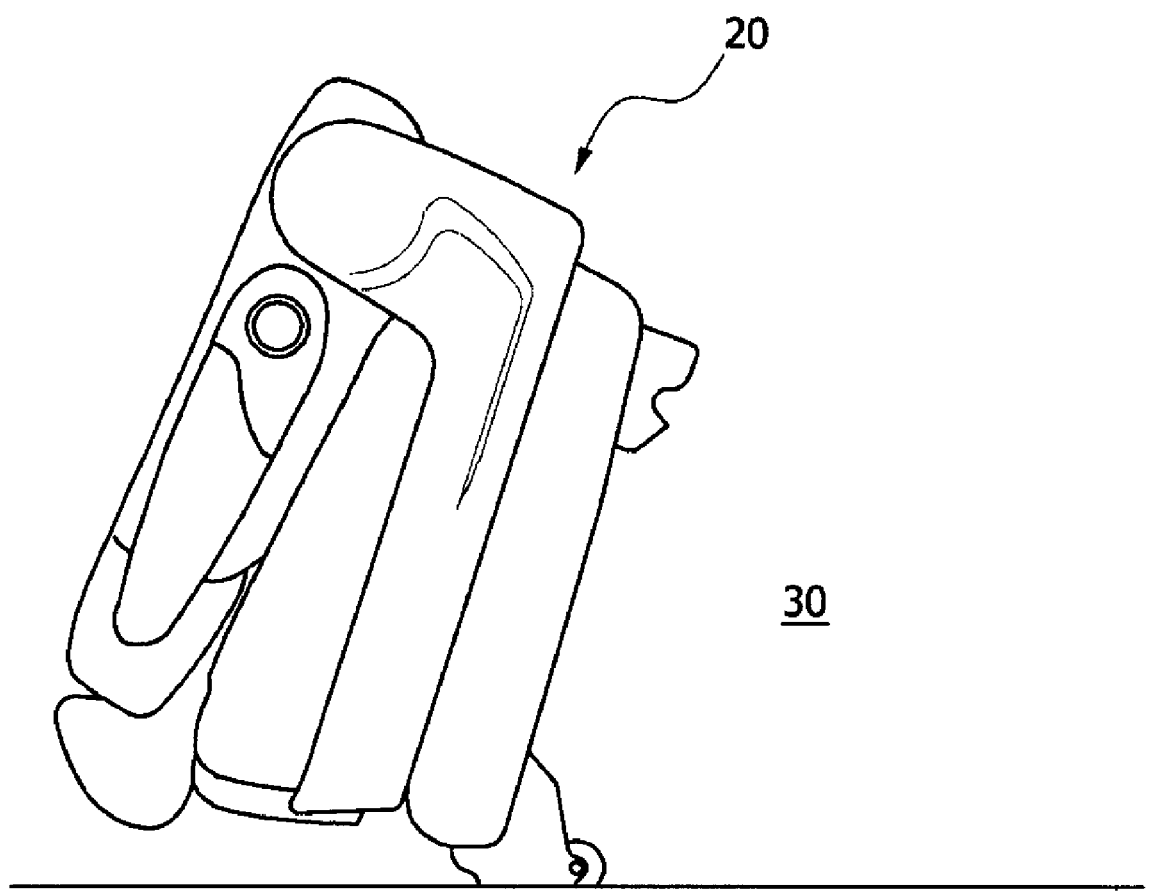
FIG. 2 illustrates a conventional folded double folding seat.
Figure 3:
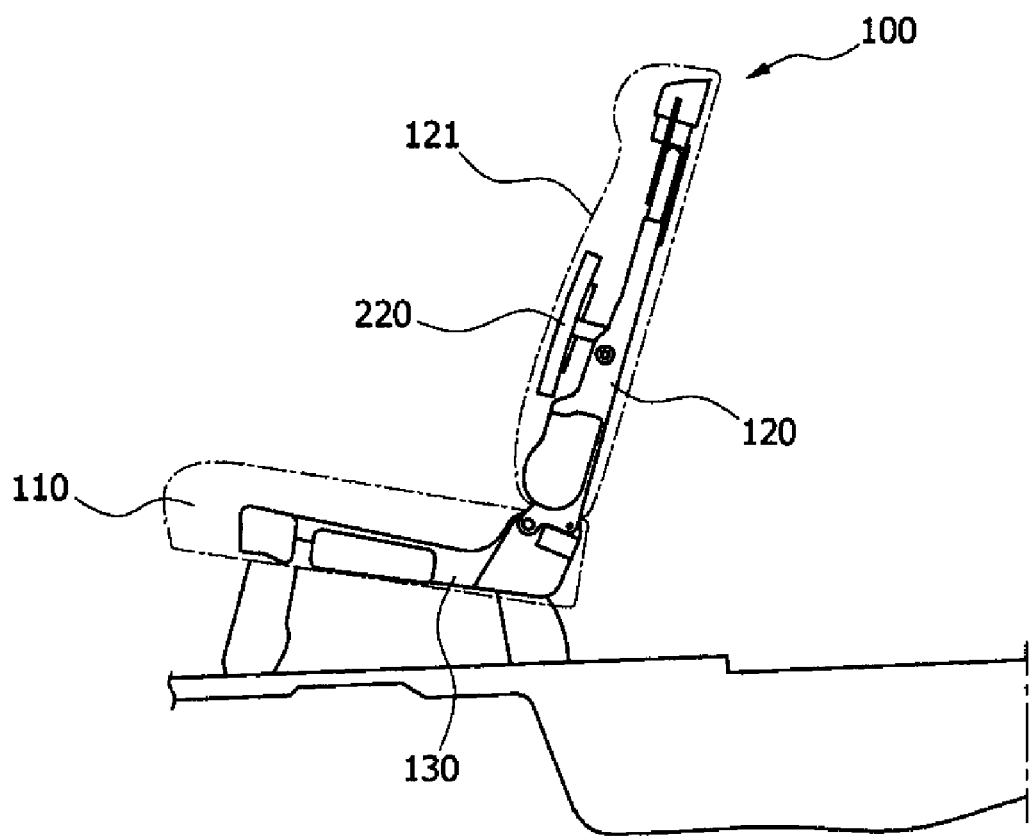
FIGS. 3 and 4 illustrate folded and unfolded states of an automobile seat to which an exemplary side bolster apparatus according to the present invention is applied.
Figure 4:
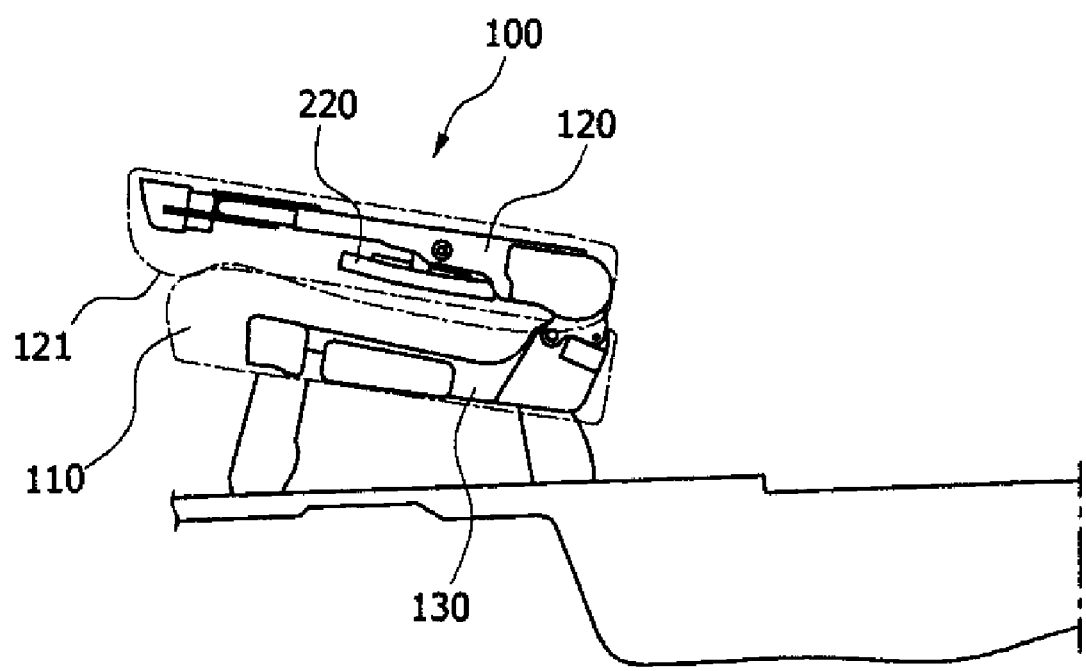
Figure 5:
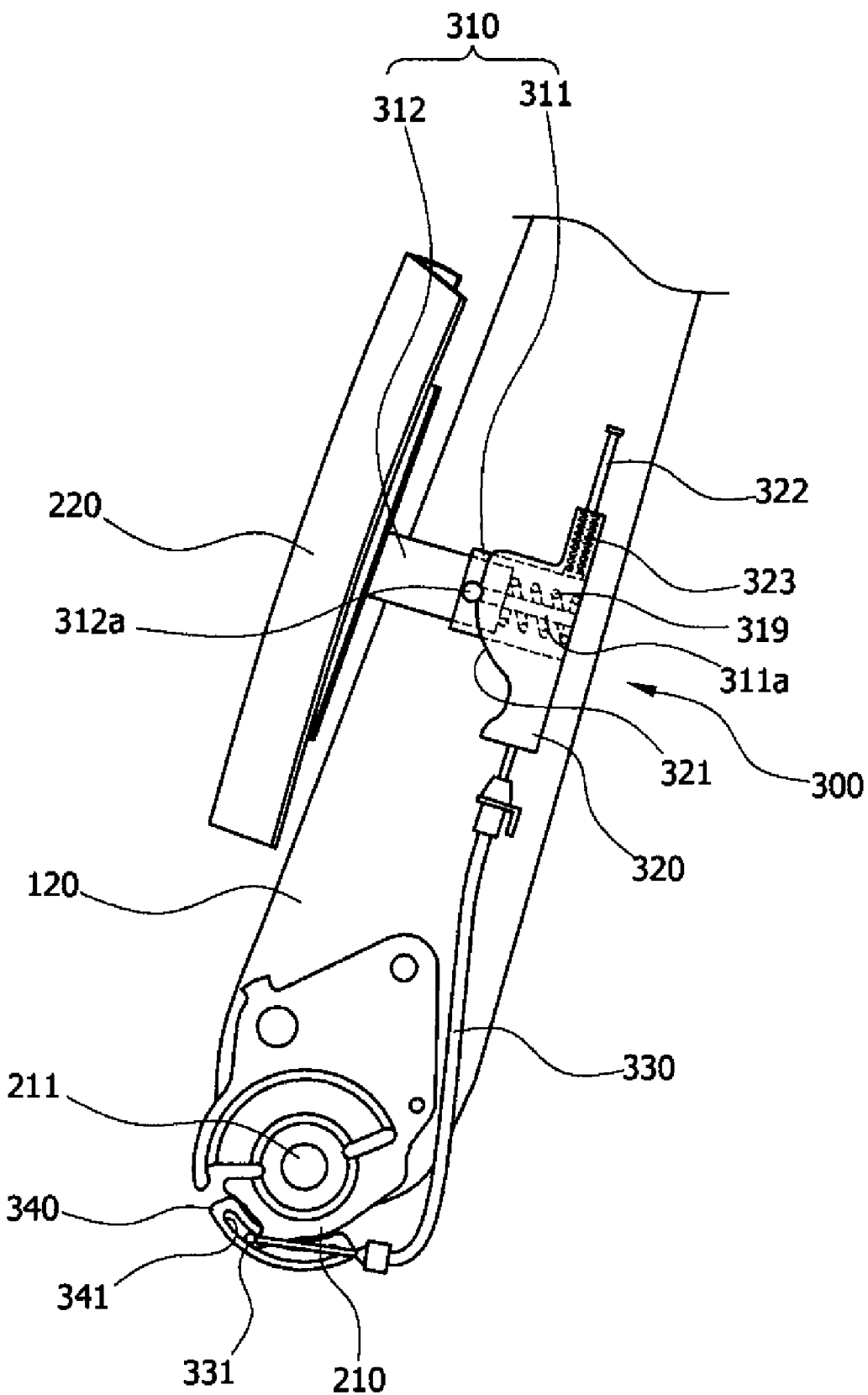
FIG. 5 illustrates a structure in which bolster are raised while a seat back is unfolded according to the present invention.
Figure 6:
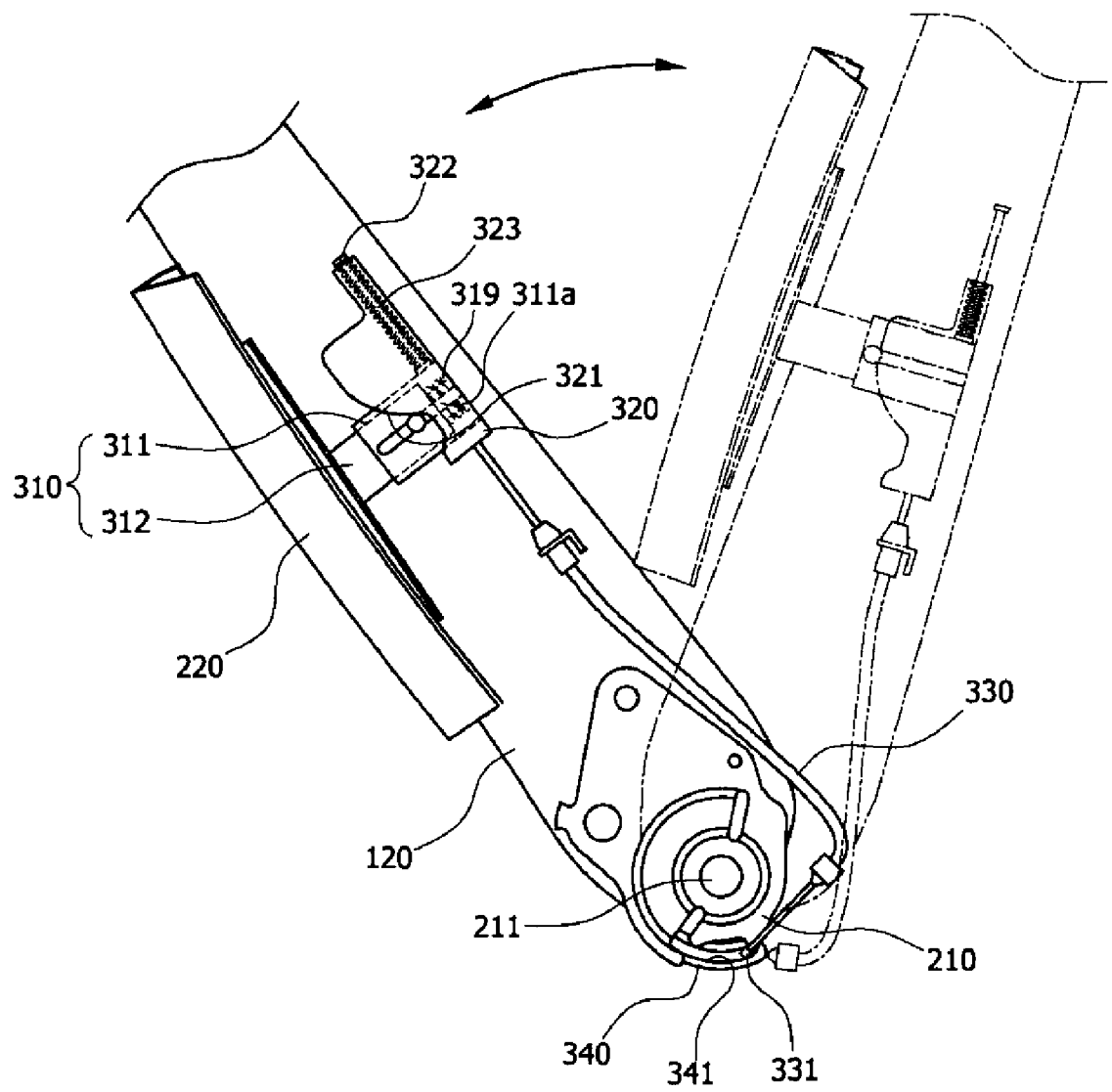
FIG. 6 illustrates a structure in which bolster are lowered while a seat back is folded according to the present invention.

FIGS. 3 and 4 illustrate unfolded and folded states of an automobile seat to which a side bolster apparatus according to various embodiments of the present invention is applied. FIG. 5 illustrates a structure in which a bolster module is raised while a seat back is unfolded. FIG. 6 illustrates a structure in which a bolster module is lowered while a seat back is folded.

In various embodiments of the present invention, as illustrated in FIGS. 3 and 4, a side bolster apparatus is installed on an automobile seat 100, which includes a seat cushion 110 and a seat back 120 pivotably installed on the seat cushion 110, wherein the seat cushion 110 is mounted on a seat frame 130. The seat frame 130 is pivotally coupled to a lower portion of the seat back 120 via a rotating shaft 211.

As illustrated in FIG. 3, the seat back 120 allows a passenger to take a seat when unfolded. As illustrated in FIG. 4, the seat back 120 is in contact with the seat cushion 110 when folded. In various embodiments of the present invention, when the seat back 120 is unfolded as in FIG. 3, bolster 220 is raised from rear side of the seat back 120 so as to improve seating comfort of the passenger. In contrast, when the seat back 120 is folded forwards as in FIG. 4, the bolster 220 is lowered such that a thickness of the seat back 120 is reduced.

Here, the bolster 220 and the other related constituents are housed in a fabric 121 of which an outer surface of the seat back 120 is formed, so that they are not exposed to the outside in a seat 100, a finished product. However, in order to help clearer understanding of the configuration of various embodiments of the present invention, FIGS. 5 and 6 show that the fabric 121 is removed from the seat 100.

As illustrated in FIGS. 5 and 6, various embodiments of the present invention generally includes a pressing unit 210, the bolster 220, and an external force transmitting unit 300.

The pressing unit 210 is formed on lower portion of the seat back 120 so as to pivotally rotate with respect to the rotating shaft 211 of the seat back 120. Thus, when the seat back 120 rotates, the pressing unit 210 also rotates around a rotating shaft 211 of the seat back 120.

Meanwhile, the bolster 220 is configured to be able to protrude forwards from the rear side of the seat back 120. As illustrated in FIGS. 3 and 4, the bolster 220 is not actually exposed to the outside in the finished seat 100 because it protrudes inside the fabric 121. However, when the bolster 220 pushes the fabric 121 of the seat back 120 from the inside to the outside, the rear side of the fabric 121 of the seat back 120 protrudes to the outside.

Thus, bolster 220 preferably has the shape of a plate having predetermined length and width or the shape in which such a plate is convexly bent at a predetermined curvature so as to prevent the fabric 121 of the seat back 120 from being torn or damaged when pushing the fabric 121 of the seat back 120. However, each bolster 220 is not limited to its shape.

The external force transmitting unit 300 receives external force from the pressing unit 210 when the seat back 120 is unfolded, and then transmits the external force to the bolster 220 such that the bolster 220 protrudes from the seat back 120.

To this end, the external force transmitting unit 300 includes an elevator 310, a direction converter 320, and a cable 330.

The elevator 310 is configured to raise or lower the bolster 220 with respect to the seat back 120. To this end, the elevator 310 generally includes a stationary guide 311 and a movable guide 312.

The stationary guide 311 is fixed to the seat back 120 and an end portion of the movable guide 312 is slidably inserted into the stationary guide 311. The direction converter 320 can be displaced at a lateral side of the stationary guide 311.

The stationary guide 311 is further provided with a long slit 311a on one side thereof in a longitudinal direction thereof. The movable guide 312 is provided with a guide knob 312a on one side thereof which is fitted into the slit 311a of the stationary guide 311.

Thus, the movable guide 312 is slidably moveable in the stationary guide 311 according to the direction converter 320 as the guide knob 312a of the movable guide 312 is fitted into the slit 311a of the stationary guide 311.

The movable guide 312 receives the external force from the direction converter 320, which will be described below, and thus protrudes from the stationary guide 311. As a result, the bolster 220 protrudes forwards from the seat back 120 to push the fabric 121.

At this time, since the guide knob 312a of the movable guide 312 moves along the slit 311a, the movable guide 312 is prevented from being separated from the stationary guide 311.

In various embodiments of the present invention, an extension spring 319 may be displaced under the movable guide 312 and couples the movable guide 312 and the seat back 120 in the stationary guide 311 so that the movable guide 312 is biased toward the seat back 121. Thus, when the external force applied to the movable guide 312 is removed, the bolster 220 is lowered by restoring force of the extension spring 319.

Further, a compression spring 323 is installed in the direction converter 320 between a lateral side of the stationary guide 311 and a portion of the direction converter 320 in substantially perpendicular direction to the longitudinal axis of the movable guide 312. Thus, when the external force applied to the direction converter 320 is removed, the direction converter 320 may move upwards along the seat back 120 by restoring force of the compression spring 323.

In detail, the movable guide 312 of the elevator 310 moves perpendicular to the direction where the direction converter 320 moves, and thus the direction converter 320 is required to convert a transmitting direction of the external force provided by the pressing unit 210.

Accordingly, the direction converter 320 is provided with a slope 321 in order to apply the external force to the elevator 310. As illustrated in FIG. 5, since the slope 321 of the direction converter 320 is inclined at a predetermined angle, guide knob 213a of the movable guide 312, which is in contact with the slope 321, moves along the slope 321 and accordingly the movable guide 312 moves perpendicular to the moving direction of the direction converter 320 when the direction converter 320 moves.

Here, the direction converter 320 moves within the stationary guide 311. Preferably, the direction converter 320 is provided with a guide pin 322 fixed to the seat back 121 so as to guide the direction converter 320 along a designated path.

Further, the direction converter 320 preferably is returned to its original position by restoring force of the compression spring 323 when the external force of the pressing unit 210 is removed.

The cable 330 is connected to the direction converter 320 at one end thereof, and to the pressing unit 210 at the other end thereof. When the pressing unit 210 rotates clockwise in the drawing, the other end of the cable 330 is pulled by rotating force of the pressing unit 210, thereby pulling the direction converter 320 downwards.

Thus, as the direction converter 320 approaches the cable 330, the movable guide 312 protrudes forwards from the stationary guide 311 due to the slop 321 of the direction converter 320, so that the bolster 220 protrude forwards from the seat back 120.

Meanwhile, the other end of the cable 330 has a ball 331 hooked on the pressing unit 210, and a ball guide 340 having a guide slot 341 is provided on a rotating path of the pressing unit 210 such that the ball 331 moves along the rotating path of the pressing unit 210, wherein the ball guide 340 is formed at the seat frame 130.

Here, the guide slot 341 may have a linear shape as far as the ball 331 is hooked on the pressing unit 210. Preferably, the guide slot 341 has an arcuate shape corresponding to the rotating path of the pressing unit 210.

For convenience in explanation and accurate definition in the appended claims, the terms "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side bolster apparatus for a foldable seat back, the side bolster apparatus comprising:
   a pressing unit formed in a lower portion of the seat back so as to provide an external force generated by rotating the seat back;
   a bolster configured to protrude forwards from a rear side of the seat back; and
   an external force transmitting unit connected to the pressing unit and receiving the external force from the pressing unit when the seat back is unfolded and transmitting the received external force to the bolster such that the bolster protrudes from the seat back,
   wherein the bolster has a predetermined curvature in a longitudinal direction of the seat back;
   wherein the external force transmitting unit includes:
      an elevator raising or lowering the bolster with respect to the seat back;
      a direction converter slidably coupled to the seat back and moving in substantially perpendicular direction to a movement direction of the elevator, wherein the direction converter has a slope so as to provide the external force to the elevator; and
   a cable, wherein one end thereof is connected to the direction converter and the other end thereof is connected to the pressing unit; and
   wherein the elevator includes:
      a stationary guide fixed to the seat back such that the direction converter is displaceable thereto, wherein the stationary guide has a slit formed on one lateral side thereof in a direction where the bolster is raised or lowered; and
      a movable guide slidably coupled to the stationary guide, one end of which is connected with the bolster and the other end of which includes a guide knob fitted into the slit of the stationary guide to move therein, the movable guide raised or lowered by the slope of the direction converter.

2. The side bolster apparatus according to claim 1, wherein the direction converter includes a guide pin, one end of which is fixed to the seat back so as to guide motion of the direction converter along a designated path.

3. The side bolster apparatus according to claim 2, wherein the other end of the guide pin is configured to pass through a portion of the direction converter to guide the motion of the direction converter.

4. The side bolster apparatus according to claim 2, wherein the guide pin is aligned to be in substantially perpendicular direction to movement direction of the movable guide of the elevator.

5. The side bolster apparatus according to claim 1, wherein the direction converter includes a first elastic member disposed substantially along a movement direction of the direction converter wherein the cable pulls the direction converter downward by the external force of the pressing unit and is restored to an original position thereof by a restoring force of the first elastic member when the external force of the pressing unit is removed so that the bolster returns to original position thereof.

6. The side bolster apparatus according to claim 5, the elastic member is a compression spring.

7. The side bolster apparatus according to claim 1, wherein the elevator includes a second elastic member disposed under the movable guide in the stationary guide and couples a lower portion of the movable guide and the seat back so that the movable guide is biased toward the seat back.

8. The side bolster apparatus according to claim 7, the elastic member is an extension spring.

9. The side bolster apparatus according to claim 1, wherein the cable includes a ball hooked on the pressing unit at the other end thereof, and the pressing unit includes a ball guide having a guide slot on a rotating path thereof such that the ball moves along the rotating path of the pressing unit, wherein the ball guide is formed at the seat frame.

10. The side bolster apparatus according to claim 9, wherein the guide slot has an arcuate shape corresponding to the rotating path of the pressing unit.

* * * * *